United States Patent [19]
Fukuda et al.

[11] 3,834,860
[45] Sept. 10, 1974

[54] APPARATUS FOR HEATING AND CALCINING OF POWDER AND/OR PULVERIZED MATERIALS

[75] Inventors: Yoshiharu Fukuda; Yoshihiko Ueda, both of Tokyo, Japan

[73] Assignee: Onoda Cement Co. Ltd., Onoda-shi, Yamaguchi-ken, Japan

[22] Filed: Sept. 20, 1972

[21] Appl. No.: 290,766

[30] Foreign Application Priority Data
Mar. 8, 1972  Japan.............................. 47-23798

[52] U.S. Cl..................... 432/58, 34/57 E, 432/15, 432/106
[51] Int. Cl........................................... F27b 15/00
[58] Field of Search ................ 432/14, 15, 58, 106; 34/57 E

[56] References Cited
UNITED STATES PATENTS
| | | | |
|---|---|---|---|
| 729,009 | 5/1903 | Sutton et al. | 34/57 E |
| 1,905,263 | 4/1933 | Burner | 34/57 E |
| 3,319,349 | 5/1967 | Heinemann | 432/58 X |
| 3,364,589 | 1/1968 | Muller | 34/57 E |

Primary Examiner—John J. Camby
Attorney, Agent, or Firm—Millen, Raptes & White

[57] ABSTRACT

An apparatus for preheating or calcining of powder and/or pulverized materials in which a cylindrical combustion furnace comprises a precombustion chamber and a main combustion chamber. Air inlet pipes are connected tangentially to said respective chambers in order that the air for use in combusting blown in said chambers from said air inlet pipes does a circling movement of the air stream.

The precombustion chamber is provided with a fuel spraying burner, and material feeding devices are set in combustion air inlet pipes which lead to said main combustion chamber in order to separate powder and/or pulverized materials from the fuel gas in said combustion chamber by means of the centrifugal power and, further, to heat and calcine said material directly by a high temperatured combustion gas so as to obtain a calcining efficiency without incurring a damage to the wall of said furnace by heat.

8 Claims, 17 Drawing Figures

APPARATUS FOR HEATING AND CALCINING OF POWDER AND/OR PULVERIZED MATERIALS

The present invention relates generally to an apparatus for preheating or calcining of a powder and/or pulverized material, such as materials of cement, caustic lime, etc. More particularly, the invention relates to an apparatus which includes a suspension preheater interconnected through ducts and material supply chutes to a plurality of cyclones and a rotary or calcining kiln, for exchanging the heat of an exhaust gas in a rotary or calcining kiln, with that of the powdered and/or pulverized material.

It is logically possible to obtain a high calcining efficiency, namely a high decarbonizing efficiency, in the process of preheating or calcining of the material of cements, by raising the temperature of the combustion gas entering a suspension preheater which is connected to a kiln in front of the outlet of said rotary or calcining kiln. However, it has been practically difficult to obtain a calcining efficiency as desired because, when the temperature of gases in conventional types of preheater exceeds the melting point (approximately 1,100°C) of the material of cements, the fused portion of the material of cements adheres or conglutinates to interior walls of the apparatus, often causes the rotary kiln smoke duct to become blocked, rendering the apparatus inoperable. Therefore, the temperature of gases in prior art devices must be maintained below the melting point of the pulverized material.

Under such circumstances, it has been technically difficult to obtain a calcining efficiency above 30 percent. Other problems are excessive heating of the combustion gas causes a diffusion or radiation of heat through the wall of the preheater or damage to the wall.

SUMMARY OF THE INVENTION

It is, therefore, an object of the present invention to provide an improved apparatus for heating powdered and/or pulverized material with temperature combustion gases to obtain a high calcining efficiency.

It is another object of the invention to provide an improved calcining apparatus which is free from conglutination of material to the interior of the combustion furnace even when the material is heated by a high temperature combustion gas.

It is still another object of the invention to provide an improved apparatus which is designed to prevent high temperatured combustion gases from damaging the walls of the furnace.

It is another object of the invention to provide an improved apparatus with a high thermal efficiency by preventing diffusion or radiation of heat from high temperature gases through the furnace wall.

The improved apparatus includes a cylindrical combustion chamber interconnected by ducts to cyclones and to a suspension preheater for providing heat exchange between an exhaust gas from a rotary or calcining kiln and powdered and/or pulverized material.

The combustion chamber comprises a precombustion chamber and a main combustion chamber. Air inlet pipes are tangentially connected to respective chambers. The precombustion chamber 2 is equipped with a burner which spouts flames towards a preheater. Material feeding devices are located in the air inlet pipes installed in the main combustion chamber.

Other objects, features and advantages of the apparatus according to the present invention will become apparent from the following description, taken in conjunction with the accompanying drawings in which like reference numerals and characters designate corresponding parts and elements throughout the figures.

DESCRIPTION OF THE PREFERRED EMBODIMENTS

Figure 1:
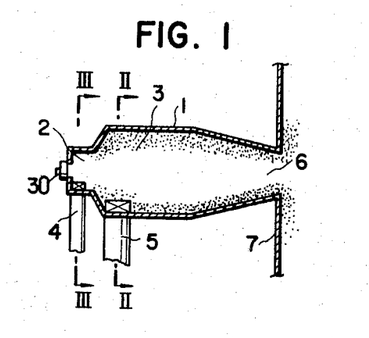
FIG. 1 is a longitudinal sectional view showing a preferred embodiment of an apparatus for heating and calcining of the powder and/or pulverized material according to the invention.
Figure 2:
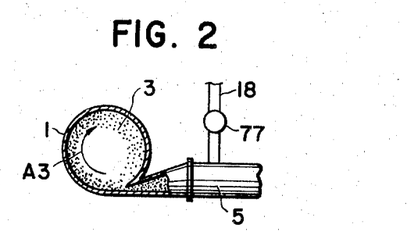
FIG. 2 is a sectional view along the line II—II shown in FIG. 1.
Figures 3, 4:
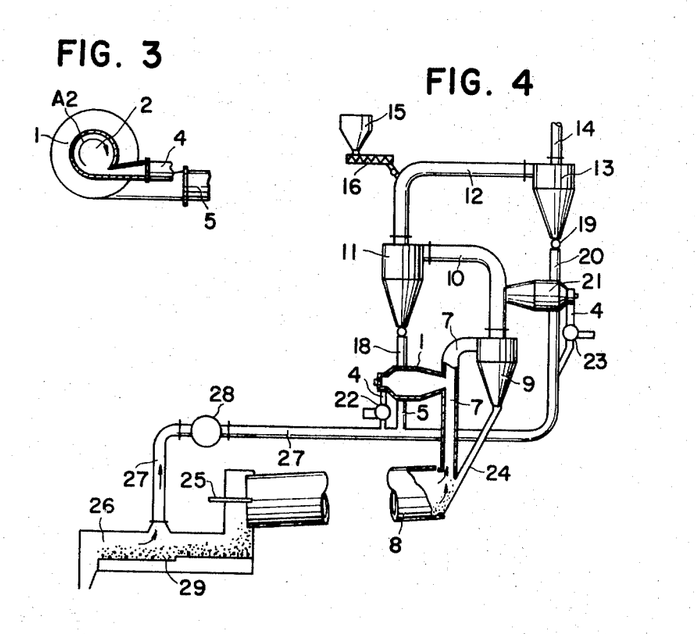
FIG. 3 is a sectional view along the line III—III in FIG. 1.
FIG. 4 is a side-view of a cement calcining apparatus combined with two suspension preheaters each of the preheaters being as shown in FIG. 1.

Reference is now made to the drawings, first to FIG. 1 which shows a preferred embodiment of an apparatus for heating and calcining of powdered and/or pulverized material according to the invention. As illustrated in FIGS. 1-4, the apparatus has a cylindrical combustion furnace 1 comprising a precombustion chamber 2 and a main combustion chamber 3, respectively of sectionally rounded shapes, the chambers being coaxially interconnected. The precombustion chamber 2 is equipped with a fuel injector burner 30 directed toward the inside of the precombustion chamber 2, and is provided with an air inlet pipe 4 on the circumferential wall of the precombustion chamber 2 at a tangent. Another air inlet pipe 5 is set at a tangent on the circumferential wall of the main combustion chamber 2 in a location close to said precombustion chamber. A material feeding device 77 (FIG. 2) is connected to air inlet pipe 5. An exhaust port 6 is formed at the farthest end of the precombustion chamber 2, and said exhaust port opens to a smoke duct 7 at the nearest place to a cement calcining kiln 8 (FIG. 4). Exhaust gas from the kiln 8 goes up the smoke duct 7 and proceeds respectively to a cyclone 9, smoke duct 10, cyclone 11, smoke duct 12, cyclone 13 and smoke duct 14.

The material of cements is supplied from a hopper 15 and a conveyor or a material feeding device 16 conveys said material of cements into a smoke duct 12. The material of cements supplied from the conveyor 16 is carried in a cyclone 13 together with the exhaust gas running in the smoke duct 12 and is preheated in said cyclone and at the same time is separated into the exhaust gas and into the powder and/or pulverized material. The exhaust gas separated goes up into the smoke duct 14, while said material is supplied through an air-lock device 19 and a material feeding device 20, into a combustion furnace 21 of the same structure as the aforementioned combustion furnace 1. Fans 22 and 23 supply air respectively to the combustion furnaces 1 and 21. The material of cements preheated and calcined in the combustion furnace 21 then moves to the smoke duct 10 accompanied by said exhaust gas and travels together with the exhaust gas running in said smoke duct, to the cyclone 11 in which said material is preheated and at the same time is separated into the exhaust gas and into the powder and/or pulverized material in the same process mentioned above. Then the powder and/or pulverized material is carried into the combustion furnace 1 via a material supplying chute 18 and a material feeding device 77, and after being heated in said furnace, is carried to a kiln 8 via smoke duct 7, a cyclone 9 and a chute 24. In the kiln 8, the material is calcined into a clinker by flames from the kiln burner 25 and then is cooled by the cooler 26. The air heated in exchange of cooling said material is conveyed to the aforementioned air inlet pipes 4 and 5 through the air-pipe 27 by dint of a ventilating fan 28.

As illustrated in FIG. 3, the air enters the combustion furnace 1 from the air inlet pipe 4, rotates in the direction of arrow A2 and combusts a part of the fuel blown in from the burner 30. The combustion gas thus produced proceeds towards the main combustion chamber 3, heating the unburned remainder of said fuel. The material of cements and the air for use in combusting enter the main combustion chamber 3, and also rotate in the direction of arrow A3. The centrifugal force generated by said movement causes a rotary movement of the material and of the air along the interior surface of the wall of said main combustion chamber, carrying said material towards the exhaust port 6 and thence to the smoke duct 7. On the other hand, the combustion gas traveling axially inside of said circling material proceeds directly towards the smoke duct 7. The air, for use in combusting, blends or mixes with the aforementioned unburned remainder of the fuel flowing from the precombustion chamber 2 to the main combustion chamber 3 and completely combusts the fuel into a high-temperatured combustion gas which heats up said circling material directly and internally.

In this process, the material of cements can be preheated or calcined in a considerably shorter time than in conventional apparatus. Further, because of the rotating flow of the material of cements between the high-temperature combustion gas and the interior surface of the wall of the combustion furnace 1, said combustion gas does not come in direct contact with said wall of the combustion furnace 1. Thus, the apparatus prevents the wall of the furnace from being damaged by heat and minimizes thermal diffusion or radiation through said furnace wall, without a loss of the thermal efficiency. Still further, since the high-temperature combustion gas directly heats up the material of cements in the process of circling together in the combustion furnaces 1 and 21, a heat exchange is sufficiently performed and the exhaust gas generated in this process and proceeding to the smoke duct 6 is cooled to the extent that the material of cements does not adhere or conglutinate to block the smoke duct passage and disable the apparatus.

In another embodiment of the apparatus according to the invention as shown in FIGS. 5 through 9, a combustion furnace 31 comprises a precombustion chamber 32 and a main combustion chamber 33 both of which are equipped respectively with a throttle 35 at the outlet 34 of the precombustion chamber 32 and a throttle 37 at the outlet 36 of the main combustion chamber 33. An air inlet pipe 38 is set at a tangent to the precombustion chamber 32 and said air inlet pipe is provided with a swirl vane 39 in order to create a spiral movement of the air entering said combustion furnace 31. Therefore, this spiraling stream of the air in the precombustion chamber 32 performs a double circling in the direction of arrow A32. On the other hand, the fuel conveyed through the fuel pipe 40 and sprayed in the combustion furnace 31 through the spray nozzle 41, blends or mixes with the aforementioned double circling air stream and produces a high heat release combustion. The high-temperature combustion gas is fed from the precombustion chamber 32 into the main combustion chamber 33, where the gas blends or mixes with both fuel, conveyed via a fuel pipe 42 and a spraying nozzle 43, and with air entering via an air inlet pipe 44, producing a high heat release combustion in said main combustion chamber 33. The combustion in the precombustion chamber 32 assists a further combustion in the main combustion chamber 33 and ensures a fixed combusting condition even when the material is supplied irregularly from the air inlet pipe 44. The powdered and/or pulverized material supplied in the injector nozzle 47 through a chute 45 by means of the material feeding device 46, is suspended in the air stream and then is carried to the main combustion chamber 33 by the air inlet pipe 44. The swirl vane 48 located at the outlet end of the air inlet pipe 44 imparts a spiraling movement to the material which it blows into the main combustion chamber 32 at a tangent, and creates a double circling in the direction of the arrow A33 in the main combustion chamber 33, dispersing the material suspended in the air.

Figure 7:
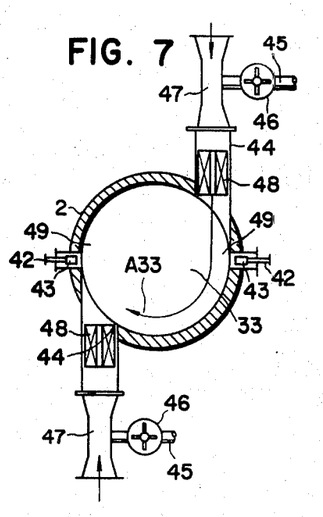
FIG. 7 is a sectional view along the line VII—VII in FIG. 5.

As shown in FIG. 7, the fuel spraying nozzle 43 is located at a position 49 where the material carried in by the swirl vane 48 meets with the interior surface of the furnace wall, in order to prevent an accumulation of the remainder of uncombusted fuel.

Figure 5:
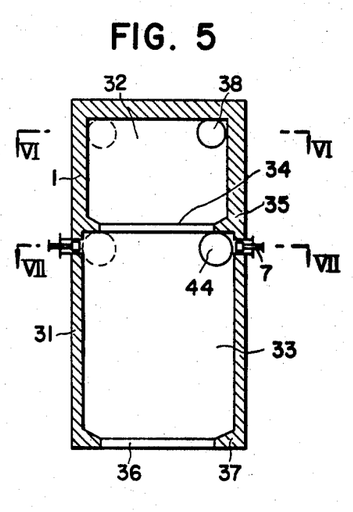
FIG. 5 is a longitudinal sectional view showing another preferred embodiment of the apparatus according to the invention.
Figure 6:
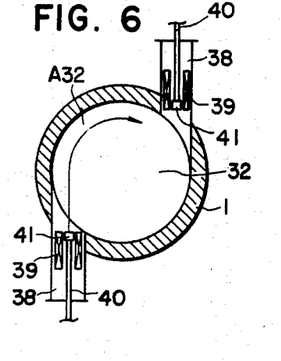
FIG. 6 is a sectional view along the line VI—VI shown in FIG. 5.
Figures 9, 10:
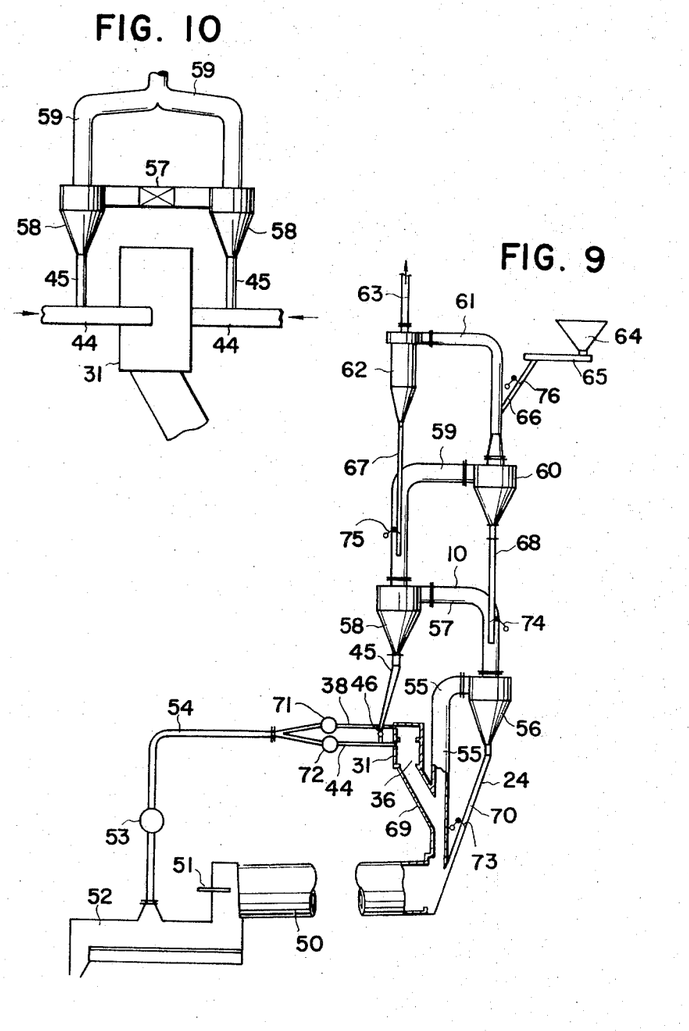
FIG. 9 is a side-view of a cement calcining apparatus combined with a suspension preheater equipped with the apparatus shown in FIG. 5.
FIG. 10 is a detailed illustration of a portion of FIG. 9.

FIG. 9 is a side-view of the apparatus for heating and calcining of powdered and/or pulverized material as shown in FIGS. 5 through 7, in which said apparatus is connected to function as a cement calcining apparatus equipped with a suspension preheater 31. Also shown in this drawing are a cement calcining kiln 50, burner 51, clinker cooler 52, fan 53 and an air-pipe 54. A smoke duct 55 is located at the exhaust port of a cement calcining kiln 50, the smoke duct being connected sequentially to cyclone 56, smoke duct 57, cyclone 58, smoke duct 59, cyclone 60, smoke duct 61, cyclone 62 and smoke duct 63. The outlet of a hopper 64 is connected to a smoke duct 61 via conveyer 65 and chute 66; the lower end of a cyclone 62 to a smoke duct 59 via chute 67; the lower end of a cyclone 60 to a smoke duct 57 via chute 68; the lower end of a cyclone 58 to a material feeding device 46 via calcining furnace chute 45; and the lower end of a cyclone 56 to a kiln 50 via chute 70. Airlock devices 73, 74, 75 and 76 are shown respectively.

As shown in FIG. 7, two air inlet pipes 44 on combustion furnace 31 are interconnected with respective material feeding devices 46, which are respectively connected to the lower end of a pair of cyclones 58 via furnace chutes 45, as shown in FIG. 9 and FIG. 10, to facilitate the automatic separation in two of high-temperature material coming from the lower ends of the cyclones 58. It is noted that the increase in number of air inlet pipes 44 provided with material feeding devices 46 should be in proportion to the number of cyclones 58.

The exhaust gas from the cement calcining kiln 50 proceeds sequentially to smoke duct 55, cyclone 56, smoke duct 57, cyclone 58, smoke duct 59, cyclone 60, smoke duct 61, cyclone 62 and thence to smoke duct 63. On the other hand, the material of cements proceeds sequentially to hopper 64, conveyer 65, smoke duct 61, cyclone 62, chute 67, smoke duct 59, cyclone 60, chute 68, smoke duct 57, cyclone 58, calcining furnace chute 45, material feeding device 46, combustion furnace 31, smoke duct 69, smoke duct 55, cyclone 56, chute 70 and thence to cement calcining kiln 50. The clinker calcined in the cement calcining kiln 50 moves to the clinker cooler 52 and undergoes a heat exchange by cooling air. The air is exhausted by the fan 53 into an air pipe 54 from which the air is blown into the combustion furnace 31 by means of fans 71 and 72.

Since both the combustion air and the material of cements enter main combustion chamber 33 from the air inlet pipe 44 in a circling movement along the interior surface of the furnace wall, a centrifugal force is generated causing the cement material to flow along the interior surface of the wall of main combustion chamber 33. On the other hand, the high-temperatured combustion gas carried in the main combustion chamber 33 from the precombustion chamber 32, circles along and in direct contact with the inside of the aforementioned flow of the material of cements.

Figure 8:
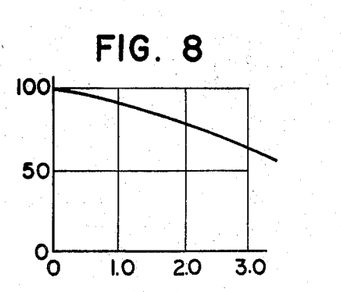
FIG. 8 is a graph showing a functional correlation between thermal diffuse radiation through the wall of the furnace (%) and the volume of a supply of the powder and/or pulverized material $(kg/Nm^3)$ in case of operation of the apparatus shown in FIGS. 5 through 7.

Since the material of cements is heated directly by the high-temperatured gas in the aforementioned process, the decarbonizing efficiency is rasied to 90–100%, as compared with that of conventional types of suspension preheaters. Furthermore, since the high-temperatured combustion gas does not come in direct contact with the interior surface of the furnace wall of the main combustion chamber 33, heat damage to the furnace wall is eliminated, and heat radiation of diffusion through the furnace wall is substantially eliminated. FIG. 8 is a diagrammatical representation of this process, showing a functional correlation in which the volume of the powdered and/or pulverized material (kg/Nm$^3$) is inversely proportional to the thermal diffuse radiation (%), for increases in the volume of material thickens the layer of the material of cements, thus lessening the diffusion of the heat of the combustion gas inside.

Figures 11, 12, 14:
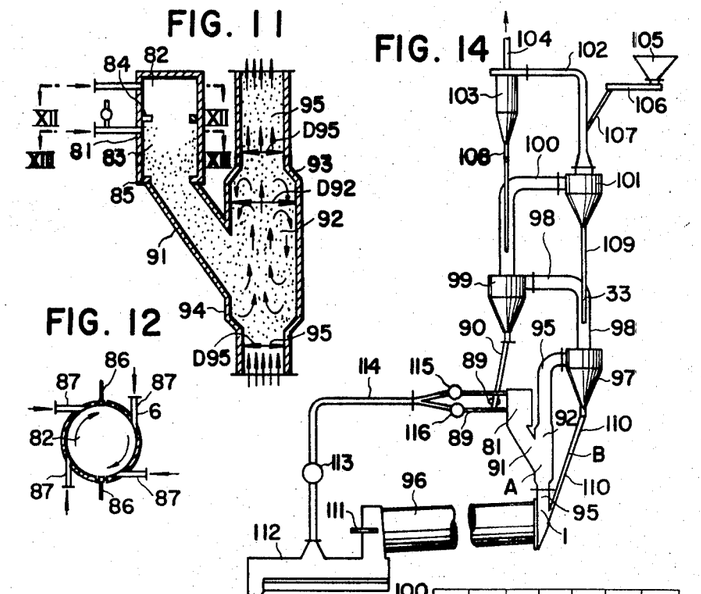
FIG. 11 is a longitudinal sectional view showing still another preferred embodiment of the apparatus according to the invention.
FIG. 12 is a sectional view along the line XII—XII shown in FIG. 11.
FIG. 14 is a side-view showing a cement calcining apparatus combined with the suspension preheater equipped with the apparatus shown in FIG. 11.
Figure 13:
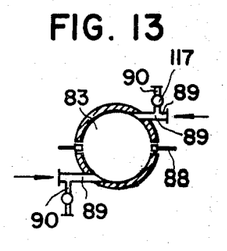
FIG. 13 is a sectional view along the line XIII—XIII in FIG. 11.
Figure 16:
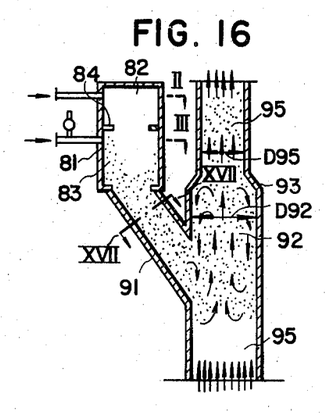
FIG. 16 is a sectional view illustrating a revision of a part of the apparatus shown in FIG. 11.

In still another embodiment of the calcining apparatus as shown in FIGS. 11 through 16, a combustion furnace 81 comprises a precombustion chamber 82 and a main combustion chamber 83 provided with throttles 84 and 85 at their respective chamber outlets. One or more fuel pipes 86, and one or more air inlet pipes 87 are mounted on the precombustion chamber 82 (FIG. 12), the air inlet pipes 87 being tangentially oriented relative to the wall of the combustion furnace 81. Mounted upon and protruding into the main combustion chamber 83 are one or more fuel pipes 88 and one or more air inlet pipes 89 (FIG. 13), the air inlet pipes 89 being tangentially oriented to the wall of the main combustion chamber 83, and connected to a calcining furnace chute 90. Both inclined duct 91 and mixing chamber 92 may each be cylindrical or square shaped (FIG. 11). As shown in FIG. 11, the upper portion 92 and the lower portion 94 of the mixing chamber 92 are narrowed so as to make the diameter D92 of said mixing chamber 92 larger than the diameter D95 of the smoke duct 95. However, as shown in FIG. 16, the narrowing may be limited to the upper end of the mixing chamber 92. As illustrated in FIG. 14, the smoke duct 95 is connected by its lower portion to the exhaust port of a cement calcining kiln 96, and by its upper end to a cyclone 97. The cyclone 97 is linked in a sequent order to a smoke duct 98, cyclone 99, smoke duct 100, cyclone 101, smoke duct 102, cyclone 103 and to a smoke duct 104. The hopper 105, used in supplying the material of cements, is connected to the aforementioned smoke duct 102 via conveyer 106 and chute 107. Similarly, the outlet of a cyclone 103 and a smoke duct 100 are connected via chute 108, the outlet of cyclone 101 and smoke duct 98 via chute 109, cyclone 99 and air inlet pipe 89 via chute 90, and cyclone 97 and cement calcining kiln 96 via chute 110. Further, a burner 111 is mounted upon the outlet of products of cement calcining kiln 96, to which a clinker cooler 112 is also connected. A fan 113, an air pipe 114, and air inlet pipes 115, 116 are interconnected between clinker cooler 112 and combustion furnace 81.

The process in which the material of cements proceeds from hopper 105 to the combustion furnace 81, and is heated while passing through respective cyclones 103, 101, 99, and the process in which the air is preliminarily heated when passing through the clinker cooler 112 and proceeds to combustion furnace 81, are exactly same as those described in the aforementioned embodiments.

The air blown or supplied in a tangential direction to the precombustion chamber 82, together with the combustion gas spouting from the fuel pipes 86, has a circling movement and proceeds to the main combustion chamber 83. The mixture of air and the material of cements blown or supplied to the main combustion chamber 83 in a tangential direction also has a circling movement in main combustion chamber 83. At the same time, the high-temperatured combustion gas from the precombustion chamber 82, together with the fuel from the fuel pipes 88, performs a high heat release combustion and then, circles in line with the aforementioned circling stream in the main combustion chamber 83. In this process, the powdered and/or pulverized material and the combustion gas, by circling in the main combustion chamber 83, generate a centrifugal force which causes the material to be carried toward the outlet of the main combustion chamber 83, forming a layer along the interior surface of the wall of main combustion chamber 83, while the combustion gas is separated from the material and moves towards the outlet, forming a layer of combustion gas along the inside of the aforementioned layer of material. The powdered and/or pulverized material and the combustion gas intercirculate, providing a direct heat exchange between the gas and material.

The powdered and/or pulverized material and the combustion gas leave the main combustion chamber 83 and enter the inclined duct 91 where, while circling in duct 91, the material is heated or calcined. Then, the material enters the mixing chamber 92 and blends or mixes with the exhaust gas flowing from the kiln 96 towards the cyclone 97 through the smoke duct 95. The contractions formed in the upper and lower portions of the mixing chamber 92 serve to change the direction of flow of the mixture of material and gas, causing a spiraling movement of the mixture, which ensures the mixture is evenly heated. Therefore, even if the heating or calcining is uneven or insufficient in the main combustion chamber 83, or in the inclined duct 91, a uniform or sufficient heating or calcining is achieved in the mixing chamber 92.

In operation, the apparatus attained a high-temperature and high heat releasing combustion ranging from 1,600–2,000°C with a low excess air in the precombustion chamber 82. After a heat-exchange between the powdered and/or pulverized material and combustion gas in the main combustion chamber 83, the temperature of the combustion gas temperature range became 1,200–1,400°C. And further, while circling in the inclined duct 91, the combustion gas made another heat-exchange, decreasing the gas temperature to 1,000–1,200°C. In the mixing chamber 92, the combustion gas is mixed with high-temperature exhaust gas (1,000–1,200°C) coming from smoke duct 95, producing a uniform gas mixture at a temperature of 900–950°C.

Figure 17:
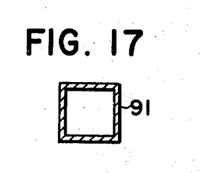
FIG. 17 is a sectional view along the line XVII—XVII in FIG. 16.

When sectional shapes of the inclined duct 91 and the mixing chamber 92 are round, a thick mobile layer of material is formed on their respective interior walls. However, when the sloped duct 91 and mixing chamber 92 are square as shown in FIG. 17, the thickness of the layer of material formed on the interior of the walls is decreased.

Figure 15:
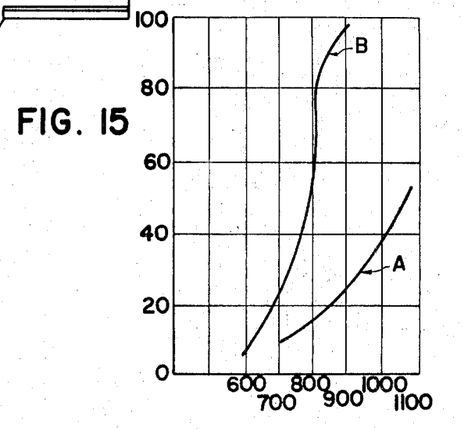
FIG. 15 is a diagrammatical presentation of data obtained in the actual operation of the apparatuses shown in FIGS. 11 through 14.

FIG. 15 is a graph of operation data obtained with the last embodiment of the apparatus, in which line A shows the temperature of the mixture gas in relation to the calcining efficiency of the apparatus at point A shown in FIG. 14, measured at the time when the material is preheated at 600–700°C, is blown in the main combustion chamber 83 and undergoes heat exchange. Line B shows the relation of the temperature of the material to the calcining efficiency at point B of the apparatus shown in FIG. 14, measured at the time when the above-mentioned material has undergone heat exchange in passing through mixing chamber 92 and cyclone 97.

As is clear from FIG. 15, the heat exchange occurs not only in the main combustion chamber 83 and the inclined duct 91 (shown per line A), but also in the mixing chamber 92 (shown per line B), thus providing an efficient heat exchanging apparatus.

The apparatus of this invention has been described in detail on the basis of three preferred embodiments, but is not limited to the specific objects described in the preferred embodiments. The description and explanation of the apparatus according to the invention is directed toward the calcining of materials of cements, but the apparatus is applicable also to the calcining of materials of caustic lime, aluminum and all other similar materials.

What is claimed is:

1. Apparatus for heating and calcining pulverized materials comprising a combustion furnace having a precombustion chamber and a main combustion chamber, both having a round cross section and connected coaxially directly to each other; a burner connected axially to the end of said precombustion chamber opposite the end thereof connected to said main combustion chamber and positioned to direct fuel axially into said precombustion and said main combustion chambers; a first combustion air inlet pipe connected tangentially to said precombustion chamber; a second combustion air inlet pipe connected tangentially to said main combustion chamber; means for supplying pulverized feed material to at least said air inlet pipe connected to said main combustion chamber; and a cyclone preheater connected to said means for supplying pulverized feed material.

2. The calcining apparatus of claim 1 further comprising swirl vanes positioned at the outlets of said first and second air inlet pipes which convey the air for use in combusting towards said precombustion and main combustion chambers, respectively.

3. The calcining apparatus of claim 1, wherein throttles are provided at the combustion gas outlet of said main combustion chamber.

4. Apparatus for heating and calcining pulverized materials comprising a combustion furnace including an upper precombustion chamber and a lower main combustion chamber, both having a circular cross section; a plurality of air inlet pipes connected tangentially to said precombustion chamber and main combustion chamber, respectively; a plurality of burners mounted respectively on and in the wall of said precombustion chamber and said main combustion chamber; a cylindrical mixing chamber of larger diametrical dimensions in the central portions as compared with that of upper and lower portions; and an inclined duct for interconnecting the central part of said mixing chamber with an outlet of said main combustion chamber.

5. The calcining apparatus of claim 4, wherein said inclined duct has a square cross section.

6. The calcining apparatus of claim 5, which further includes a rotary kiln; a first smoke duct for interconnecting said kiln to a lower port of said mixing chamber; a second smoke duct for interconnecting an upper port of said mixing chamber to a network of interconnected cyclone preheaters.

7. Apparatus for heating and calcining pulverized materials comprising a combustion furnace including an upper precombustion chamber and a lower main combustion chamber, each of said chambers being cylindrically shaped; a plurality of air inlet pipes tangentially connected to said precombustion chamber and main combustion chamber, respectively; a plurality of burners connected to said precombustion chamber and main combustion chamber, respectively; a cylindrical mixing chamber having the diametrical dimensions of its upper portions smaller than those of its lower portions; and an inclined duct for connecting a lower end of said mixing chamber to an outlet of said main combustion chamber.

8. The calcining apparatus of claim 7, wherein a lower exhaust port of said mixing chamber is connected by a first smoke duct to a rotary kiln and an upper port of said mixing chamber is connected by a second smoke duct to a suspension preheater comprising a plurality of interconnected cyclone preheaters.

* * * * *